Patented Feb. 16, 1937

2,070,936

UNITED STATES PATENT OFFICE 2,070,936

PROTECTIVE TREATMENT OF FRESH FRUITS AND VEGETABLES IN PREPARATION FOR MARKET

Miles L. Trowbridge, Pomona, Calif., assignor to Brogdex Company, Winter Haven, Fla., a corporation of Florida No Drawing. Application December 17, 1934, Serial No. 757,970

6 Claims. (Cl. 99—168)

This invention relates to protective treatment of fresh fruits and vegetables in preparation for market; and it relates more particularly to the preparation and employment of compositions useful in protectively treating fresh fruits and vegetables in order to reduce materially their normal rate of withering or shrinkage and otherwise to maintain them in sound, edible condition during commercial distribution and marketing.

The invention has practical utility in a very wide field, being applicable to protective treatment of virtually all fresh fruits and vegetables intended to be marketed in fresh condition. With respect to fresh fruits, the invention is particularly useful in the commercial packing, distribution and marketing of citrus fruits, including oranges, lemons, grapefruit, and tangerines; of deciduous fruits such as apples, plums and pears; and of miscellaneous fruits such as melons, bananas, pineapples and avocados. Among vegetables that may be effectively treated in accordance with the principles of the invention, potatoes and tomatoes may be mentioned by way of example.

In general, the process of the invention involves providing fruits or vegetables with a very thin, film-like coating of wax-like or other suitable protective material, the coating being of such extreme thinness as not to prevent or unduly interfere with the transpiration or breathing of the fruit or vegetable, yet being of a thickness sufficient to accomplish material reduction of the normal rate of withering or shrinkage caused by loss of moisture through the skin or rind; the protective material being applied to the fruit or vegetable in the form of an aqueous emulsion which, upon drying, leaves the desired protective coating adhering to the surface.

One of the difficulties heretofore encountered in protectively treating fresh fruit with aqueous emulsions of suitable coating material is the tendency for the fruit to dry very slowly after application of the emulsion in any of the various ways available, and for a relatively long time to remain more or less tacky or sticky to the touch. These disadvantages, which are so obvious as to require no detailed discussion, have been generally recognized. Through installation of expensive and more or less complicated drying equipment in the packing houses which receive the fresh fruits and vegetables from the growers and prepare them for shipment and marketing, surface drying of the fruit after the usual washing has been somewhat speeded up; but this has not satisfactorily solved the problem where the handling of the fruit involves application of a coating emulsion. In particular, the tendency for the fruit to retain an unduly moist or sticky feel has been found to persist in spite of much effort to eliminate it.

One of the principal objects of the invention is to provide a protective coating composition, in the form of an aqueous emulsion of suitable coating material, most advantageously of waxy or wax-like character, which emulsion shall have, in addition to other necessary and desirable characteristics, the property of drying with reasonable rapidity after application to fruits or vegetables and leaving thereon a thin film-like protective coating that is not sticky or tacky.

A further object of the invention is to provide suitable methods or processes of protectively treating fruit with emulsion compositions of the character set forth.

With the foregoing objects in view, as well as others which will become apparent hereinafter, the invention consists in novel processes of protectively treating fresh fruits and vegetables, novel compositions of matter useful therein, and processes of preparing such compositions, all as will be more fully described in connection with certain typical practical embodiments of the invention and will then be more particularly pointed out in the appended claims.

In preparing an emulsion for protectively coating fresh fruits and vegetables, the use of a small quantity of a soap as an emulsifying agent is known to be desirable; and it is especially advantageous that this soap be formed "internally" in the emulsion (i. e. in situ) by reaction between the soap-forming reagents in intimate commixture with the protective material to be emulsified. Adding pre-formed soap to the mixture is very much less effective in producing homogeneous, stable and otherwise satisfactory emulsions for the purposes in view. Furthermore, soaps of the alkali-forming metals are found to be particularly desirable as emulsifying agents and to be markedly superior in important respects for this purpose to soaps of other bases such as amines, for example.

The present applicant has found, however, that the specific nature of the soap-forming agents employed in emulsifying the wax-like or other suitable protective coating material has an important effect upon the properties of the protective film coating finally obtained on the fruit, with respect both to the rate of drying and also to the eventual presence or absence of an objectionable moist or sticky feel; and that by observing certain very definite precautions in preparing the coating emulsion, the above mentioned difficulties due to slow surface-drying of the treated fruit and continued tackiness or stickiness to the touch may be largely or wholly eliminated. That is to say, in employing an alkaline hydroxide or alkaline salt as the basic or alkaline reagent for formation of the emulsifying soap constituent within the mixture to be emulsified, it is important that the other soap-forming reagent shall be a free fatty acid, or a mixture of free fatty acids, per se, rather than a free fatty oil which, of course, consists mainly of fatty acid glycerides. Substantially no glyceride saponifiable under the conditions of operation should be present. The reaction between an alkaline hydroxide and a glyceride of a free fatty acid is the usual and well known saponifying reaction, producing both soap and glycerol (glycerin) simultaneously. Glycerol is a relatively very high-boiling substance and is therefore not eliminated by evaporation at the temperatures employed for the surface drying of fresh fruit or vegetables. Moreover, it is extremely hygroscopic and, if present in even only small quantities on the surface of fruit, attracts and holds moisture tenaciously, thus slowing up drying and in addition, giving the surface of the fruit a more or less permanently moist and sticky feel which is objectionable. By taking care that glycerides of fatty acids are absent from the mixture to be emulsified when conditions favorable to their saponification prevail, concomitant production of glycerol in the mixture and its resultant objectionable effects are avoided.

Within the scope of the invention, a fairly wide variety of substances are available for production of the desired emulsifying agent (soap) within the mixture or emulsion, while at the same time avoiding production of glycerol. Among suitable basic or alkaline reagents may be mentioned as typical the hydroxides, carbonates and borates of sodium and potassium. The carbonates and borates, being salts of relatively weak acids, are progressively hydrolyzed in water solution with production of the active hydroxides as required in the saponifying reaction. An alkali metal borate, e. g. ordinary borax (Na$_2$B$_4$O$_7$.10H$_2$O), is an especially desirable alkaline agent to employ in this connection and, generally speaking, is distinctly superior to other alkaline agents for the purposes of the invention. Suitable fatty acids include oleic, stearic, palmitic and linoleic, for example, all of which are readily available commercially. It is feasible to employ any other free fatty acid from which a soap satisfactorily as an emulsifying agent may be made. Reaction between any such fatty acid and a hydroxide or alkaline-reacting salt of an alkali metal results in formation of the corresponding sodium or potassium soap, with elimination of water. No glycerol is formed in this reaction.

As regards the available protective coating materials suitable for use in practicing the invention, these are numerous and varied. In general, wax-like substances, whether true waxes in the chemical sense or not, are most suitable; but the invention is not limited to the employment of any particular protective material or class of protective material, provided it is of such character that it can be emulsified in a relatively large amount of water with the aid of a soap emulsifying agent of the character described, and further provided that, when applied as herein directed, it will form on the surface of a fresh fruit or vegetable an adherent, thin, film-like coating effective to materially reduce the normal rate of withering or shrinkage, while at the same time not so completely sealing the rind or skin as unduly to interfere with the breathing or transpiration essential to the well being of the fresh fruit or vegetable as a living organism. Paraffin wax of good commercial grade is very satisfactory. Other mineral waxes, such as ozokerite and Montan wax, and waxes of vegetable origin, such as carnauba, beeswax, candelilla, etc., are also suitable waxy or wax-like materials for the purposes of the invention. Two or more such materials may sometimes be advantageously employed in mixture. This is particularly so where for any reason it is desired to make use of a hard wax, such as carnauba, which has certain valuable characteristics but is rather too hard and brittle to form by itself a satisfactory protective coating for fruit. By blending such a wax with a larger proportion of a softer waxy material like paraffin and preparing an aqueous emulsion of the mixture in accordance with the principles of the invention, protective coatings on fruits and vegetables are obtainable that possess special advantages for some purposes. A highly refined mineral oil may sometimes also be a constituent of the emulsion, if desired. As one example of such a mineral oil may be mentioned a refined petroleum distillate having a boiling point sufficiently low to cause most of it to evaporate from a thin layer of the emulsion exposed to warm air currents.

In order that the nature and underlying principles of the invention may be more fully apparent to those skilled in the art of preparing fresh fruit for market, typical formulae for emulsions suitable to use in practicing the invention, together with the methods of preparing the same, will be given hereinafter. It is to be understood, however, that these are merely illustrative of good practice and that the invention is in no sense limited thereto.

For example, an emulsion within the scope of the invention may comprise

| | Percent (by wt.) |
|---|---|
| Paraffin wax | 15 |
| Refined mineral oil | 25 |
| Oleic acid | 1.5 |
| Borax | 1 |
| Water | 57.5 |

The paraffin, mineral oil and oleic acid are heated together to form a liquid mixture which is brought to a temperature well above the solidifying point of its waxy constituent. The water with the borax dissolved therein, also heated to around the same temperature, is then run into the hot wax-oil-oleic acid mixture with vigorous agitation producing a milky emulsion that is thinly fluid at ordinary room temperatures and above. The borax and oleic acid, which are in substantially combining proportions, react in situ to form a soap which serves as the emulsifying agent.

The emulsion may be applied to fruit or vegetables in any desired manner, as by dipping, spraying, or brushing, any excess readily draining from the article being coated. One satisfactory mode of application is to cause the articles to pass through a tank containing the emulsion, preferably while submerged below the surface of the emulsion; the articles being then conveyed out of the tank and excess emulsion allowed to drain off. The thin layer of emulsion remaining on the article dries down, upon exposure to warm circulating air, for example, to provide a substantially uniform film-like waxy protective coating which is not sticky or tacky and which completely encloses the article, adhering well to its surface, and serving to reduce substantially the normal rate of withering or shrinkage, as well as affording efficient protection against infection from external sources. At the same time, this coating is gas-permeable to such an extent that it does not entirely prevent or unduly interfere with the breathing or transpiration so essential to the continued well-being of the fruit or vegetable it protects. Rubbing or brushing the fruit either during or after application of the emulsion is not necessary, but is not excluded from the practice of the invention.

Another practical formula for the emulsion is as follows:

|  | Percent (by wt.) |
| --- | --- |
| Paraffin wax | 7.5 |
| Refined mineral oil | 25 |
| Stearic acid | 1.5 |
| Borax | 1 |
| Water | 65 |

An emulsion may be prepared according to this formula and applied to fresh fruit or vegetables substantially as already described in connection with the formula first given hereinabove.

The refined mineral oil specified in the foregoing formulae may be omitted, in which case the percentage of paraffin should ordinarily be reduced substantially. It will be understood that in other respects also the foregoing emulsion formulae are merely illustrative of practice within the scope of the invention, and that the specific constituents employed, as well as the proportioning thereof, may be varied widely, while still realizing the benefits of the invention in their entirety or in substantial measure, provided the presence of glycerol (glycerin) in the emulsions is avoided.

Unless otherwise indicated, the word "fruit" as employed in the appended claims is to be understood in a generic sense to include broadly both fruit and vegetables, and the claims are to be construed accordingly.

What is claimed is:

1. The process of protectively treating fresh fruit in preparation for market which comprises coating the entire surface of fresh fruit with a fluid aqueous emulsion of suitable coating material that is normally solid, said emulsion containing as an emulsifying agent a soap formed by reaction in situ between an alkaline-reacting water-soluble compound of an alkali metal and a free fatty acid and being substantially free of glycerol, and then exposing the fruit to surface drying conditions.

2. The process of portectively treating fresh fruit in preparation for market which comprises coating the entire surface of fresh fruit with a fluid aqueous emulsion of suitable waxy coating material, said emulsion containing as an emulsifying agent a soap formed by reaction in situ between borax and a free fatty acid and being substantially free of glycerol, and then exposing the fruit to surface drying conditions.

3. As a new composition of matter, an aqueous emulsion which comprises normally solid material suitable for protectively coating fresh fruit emulsified in an aqueous medium with the aid of a soap formed by reaction in situ between an alkaline-reacting water-soluble compound of an alkali metal and a free fatty acid, said emulsion being thinly fluid, substantially free of glycerol and capable, after application to fresh fruit, of drying down to an adherent protective film coating that is substantially dry and non-tacky.

4. As a new composition of matter, an aqueous emulsion which comprises waxy material emulsified in an aqueous medium with the aid of a soap formed by reaction in situ between borax and a free fatty acid, said emulsion being thinly fluid, substantially free of glycerol and capable, after application to fresh fruit, of drying down to an adherent protective film coating that is substantially dry and non-tacky.

5. The process of preparing compositions useful in protectively coating fresh fruit which comprises emulsifying suitable fruit-coating material that is normally solid in an aqueous medium with the aid of a soap formed by reaction in situ between a water-soluble alkaline-reacting compound of an alkali metal and a free fatty acid in the absence of glycerides.

6. The process of preparing compositions useful in protectively coating fresh fruit which comprises emulsifying waxy material with the aid of a soap formed by reaction in situ between borax and a free fatty acid in the absence of glycerides.

MILES L. TROWBRIDGE.